Jan. 20, 1959   J. E. McARTHUR   2,869,930
TRACTION WHEEL WITH SEGMENTAL RIM AND RETRACTABLE LUGS
Filed Aug. 2, 1954   4 Sheets-Sheet 4
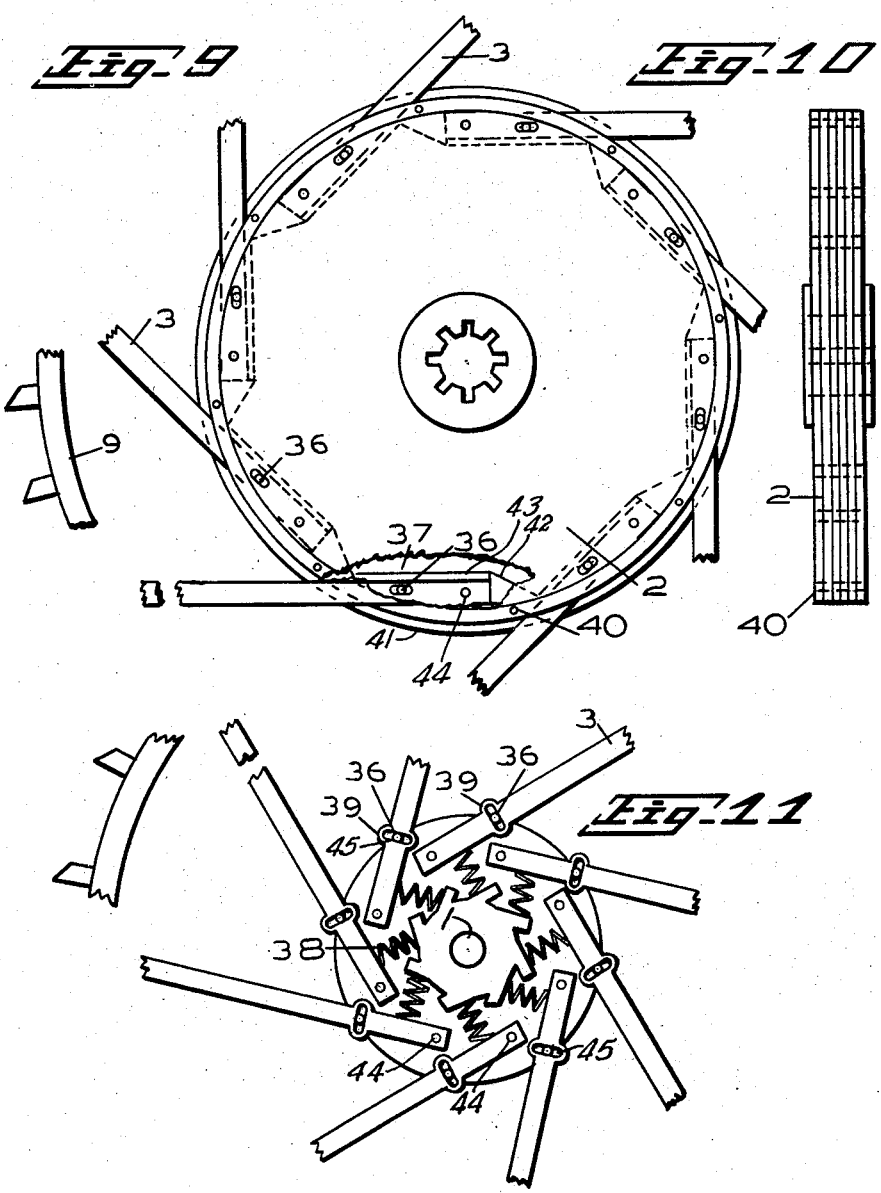
Inventor
John Ernest McArthur
Per L. J. Mitchell
Attorney

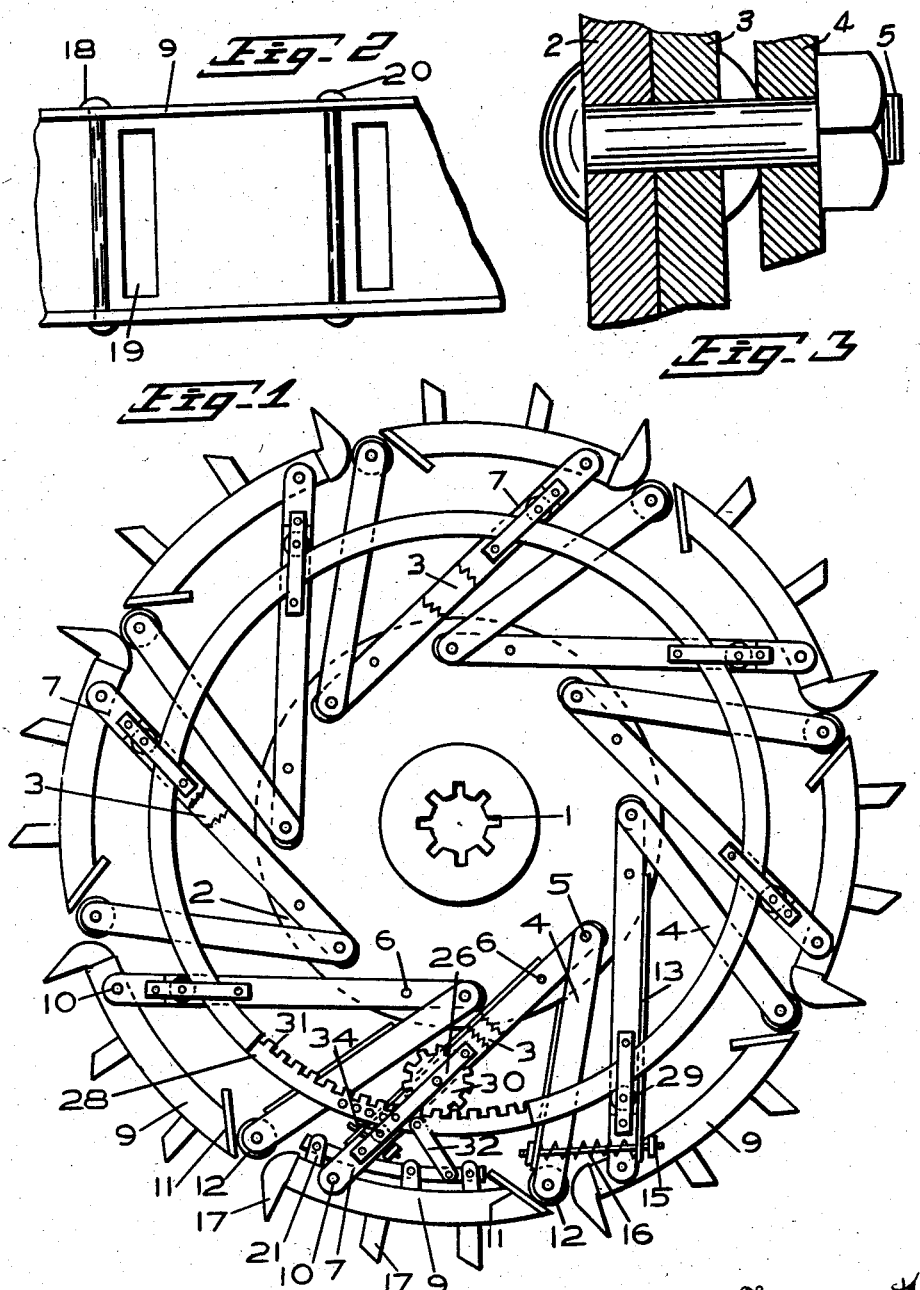

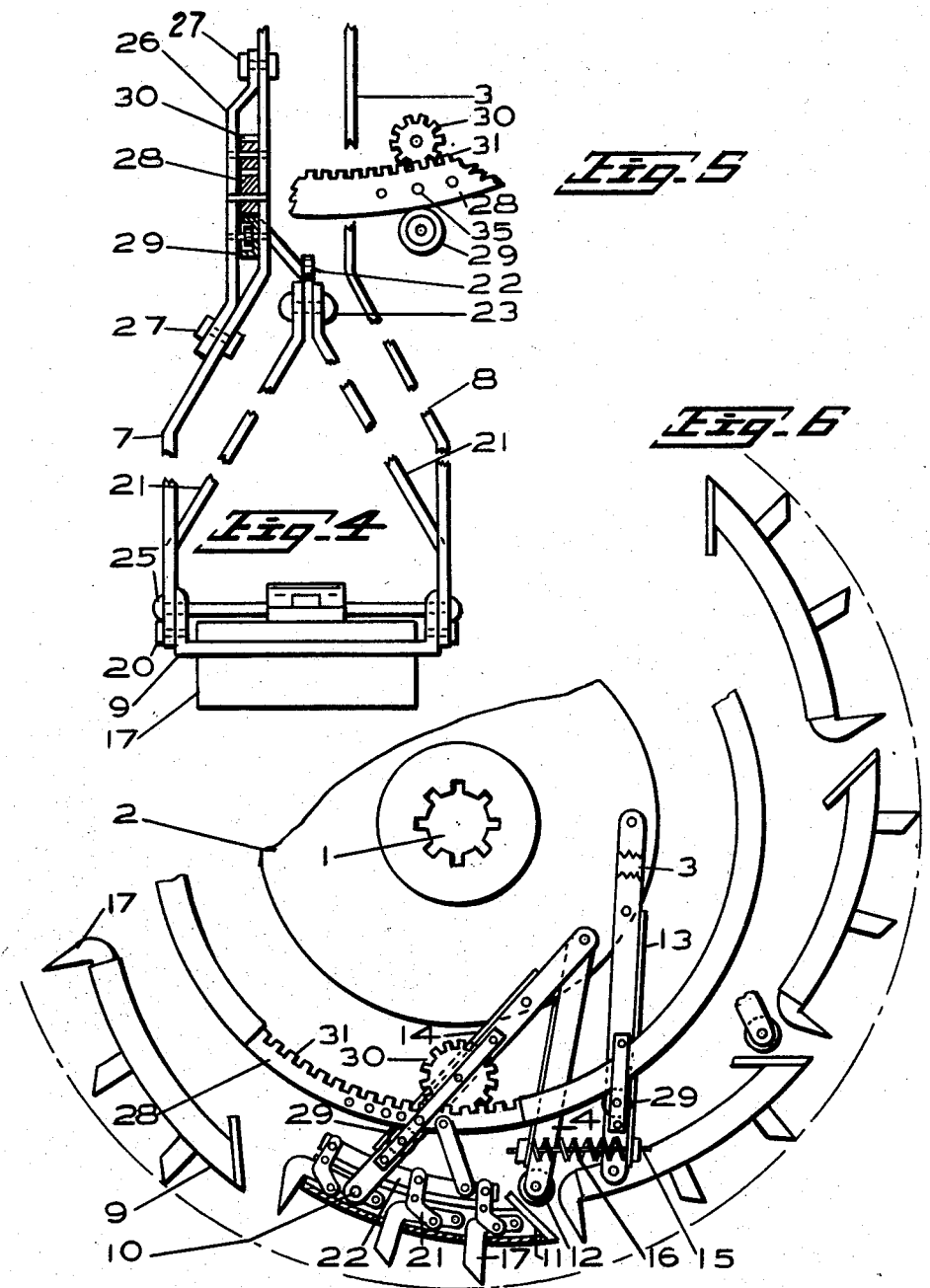

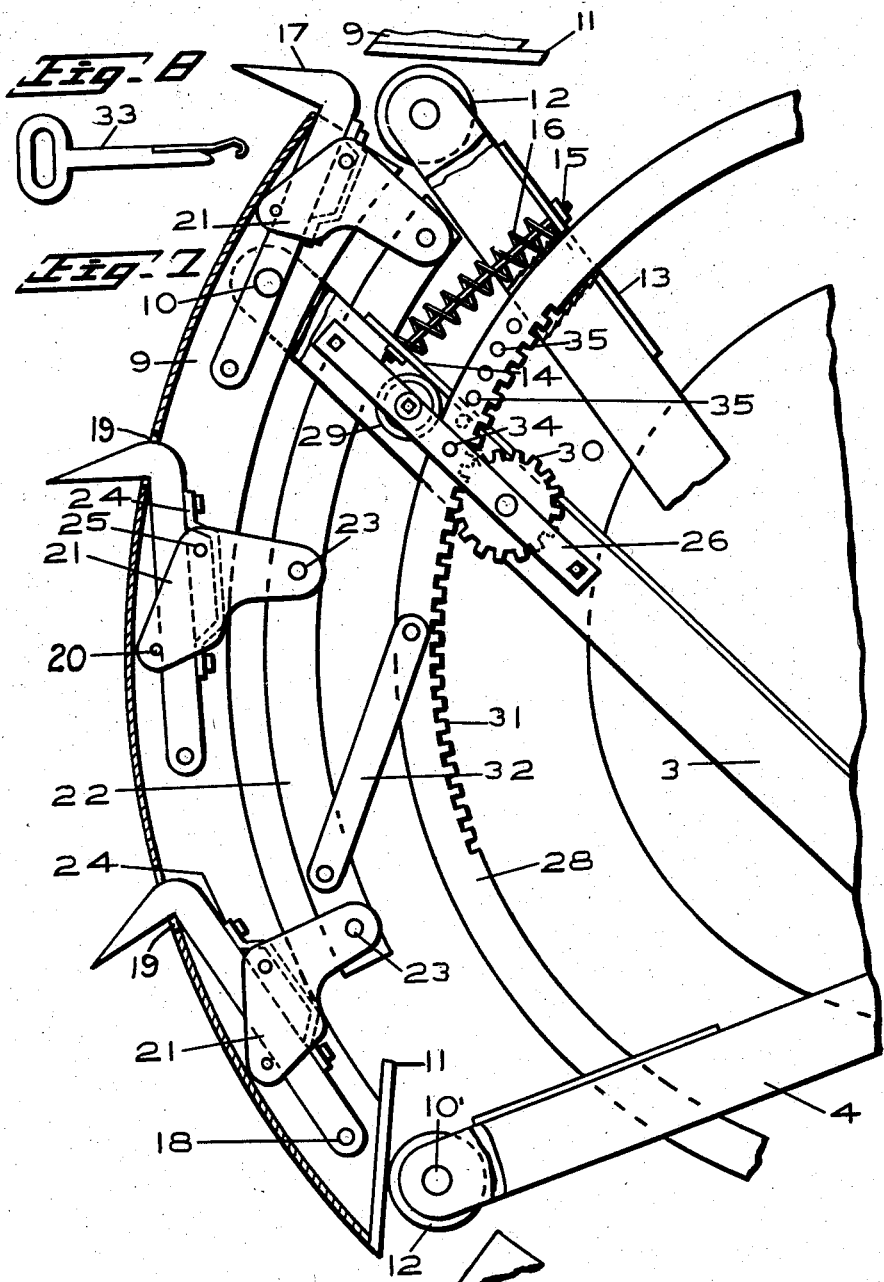

United States Patent Office 2,869,930
Patented Jan. 20, 1959

2,869,930

TRACTION WHEEL WITH SEGMENTAL RIM AND RETRACTABLE LUGS

John Ernest McArthur, Dauphin, Manitoba, Canada

Application August 2, 1954, Serial No. 447,184

2 Claims. (Cl. 301—46)

This invention relates to traction wheels, having particular reference to wheels with metal rims and in which the rims are made up of a series of segments, each provided with cushioning means and with retractable lugs.

In the art to which the invention relates rubber tired wheels and wheels with metal rims have several disadvantages, particularly their inability to grip properly when used on soft soil, and also where used for ice transport or on hard surface roads. The present invention contemplates certain improvements applied to wheels with metal rims by provision of rims made up of a number of segments that are cushioned to provide a certain amount of give and also are provided with retractable lugs.

One of the objects of the invention is accordingly to provide an improved traction wheel by provision of a wheel rim having pivotally mounted segmental rim sections that are cushioned to provide a give to the wheel under a load.

A further object of the invention is to provide in conjunction with the segmental rim sections a series of traction lugs carried thereby retractable or projectable, and including means for simultaneously retracting or projecting all the lugs and locking them in either position.

Other features and advantages of the invention will become apparent by reference to the accompanying description taken in conjunction with the drawings in which like characters of reference indicate like parts throughout the several views, and wherein:

Fig. 1 is a side view of a wheel embodying my improvements, shown partly broken away, and with the rim sections as they would appear when depressed under a heavy load, and with certain parts omitted for convenience of illustration.

Fig. 2 is a detailed inverted plan view of a fragment of a tread assembly.

Fig. 3 is a detail view showing fragments of the fixed and movable wheel spokes and the hub plate in section, and including a bolt and spacer.

Fig. 4 is a detail end view partly in section and partly broken away of an outer part of a fixed spoke for the wheel, including certain elements for moving the wheel lugs, and further showing a lug lifter plate assembly.

Fig. 5 shows a fragment of the annular plate for actuation of the wheel lugs, including the toothed wheel and roller for the fixed spoke, and further shown in relation to the fixed spoke part in figure 4.

Fig. 6 shows a side view of a fragment of a wheel with the treads in normal position and the lugs projected, and with some parts omitted and parts in section.

Fig. 7 shows a detail side view broken away in part of a wheel fragment, including a rim section with retractable lug assembly shown with the lugs projected.

Fig. 8 shows a locking key for the annular plate.

Fig. 9 shows a plan view of a modification of a hub and hub plates with spokes and a fragment of rim, including cushioning means for the spokes, shown broken away in part.

Fig. 10 shows an edge view of a hub and hub plate assembly in accordance with Figure 9.

Fig. 11 shows a plan view of a further modification of a hub plate and a series of spokes with cushioning means, shown broken away in part, and including a rim fragment.

Having reference to the drawings the wheel includes a hub 1 on which is carried a hub plate 2. To this plate is attached fixed wheel spokes 3 and movable wheel spokes 4, each by means of bolts 5, as shown in detail in Figure 3, and for the fixed wheel spokes by addition of a rivet or bolt 6. These fixed spokes project at angles of approximately sixty degrees from the hub plate radii.

The outer portions of the fixed wheel spokes 3 have attached thereto sections 7, (Fig. 4) which, in conjunction with the bent portions 8 of the spokes, form yokes for engagement with the segmental rim sections 9. These rim sections are of channel iron formation with the ends of the yokes attached to ends of the rim sections by rivets or the like 10. The opposite ends of these rim sections carry plates 11 angled inwardly from the outer ends of the sections and against which plates rollers 12 are adapted to bear, the rollers being carried by the movable spokes 4 mounted thereon by pins 10'.

Each movable spoke carries a side edge plate 13 and each fixed spoke a similar plate 14, plates of adjoining fixed and movable spokes, as in Figure 7, connected by slidable bolts 15 on which are coiled springs 16 opposing movement of the spokes together, providing cushioning means for the free ends of the rim segments.

Each of the rim sections 9 carries a series of lugs 17, three in number, pivoted on transverse pins 18 and projectable through openings 19 in the rim sections. (Fig. 2).

Pivotally mounted on the rim sections 9 by cap screws 20 (Fig. 4) are pairs of lifter plates 21, each pair connecting at the upper ends by a pin 23 to a link or bar 22. On the lugs 17 are straps 24 (Fig. 7) engaged by pins 25 between the lifter plates for lifting the lugs by pivotal movement of the lifter plates.

Each of the yoke sections 7 of the fixed spokes carries a plate 26 attached by bolts 27 and between which and the yoke section is carried an annular gear ring plate 28 supported by a roller 29 also mounted between the plate 26 and yoke section 7, and further supported by similar rollers 29 on each of the fixed spokes.

Further mounted to rotate between the plate 26 and yoke sections 7 is a toothed wheel 30 engaging a toothed section 31 on the inner edge of the annular plate 28 and adapted by turning the wheel to move the annular plate and through a link connection 32 between each link 22 and the plate 28 to move the lugs 17 and project or retract the lugs. For this a lock key 33 is provided, separately shown in Figure 8, that is engageable in openings 35 in the annular plate when brought to register with an opening 34 in the fixed spoke, and by which the plate may be secured with the lugs 17 projected or retracted.

In Figures 9, 10 and 11 are shown other mountings for the spokes 3 providing these with a limited pivotal movement and cushioning means.

Referring to Figures 9 and 10, the spokes 3 are mounted between the hub plates 2 and similar backing plates 41 that are secured together by pins 40. These plates are spaced by a further plate 42 that provides a series of seats 43 in which are set cushions 37 and against which cushions the spokes 3 bear. The spokes pivot on pins 44 and are further loosely engaged by pins 36 that allow a limited movement of the spokes against the cushions. Pins mounted in oversize openings serve the purpose since the movement is limited, but openings as provided in Figure 11 could be provided in the form of slots. The cushioning means in this showing are merely to relieve the shock on the spokes when the rim sections come in contact with the hard ground.

In Figure 11 are shown springs 38 providing the cushioning means, these springs engaging the hub 1 and spokes 3, one for each spoke. This showing has the spokes 3 enlarged at 39 to permit slotted openings 45 for the pins 36, since in this showing a greater movement of the spokes results.

In the use of the device the wheel as shown, more particularly in Figure 1, travels counterclockwise, that is with the pivoted ends of the rim sections meeting the ground first. As the wheel turns the rim sections give by pressure of the plate 11 against the roller 12 of the movable spokes and by contraction of the springs 16, the springs subsequently returning the movable spokes and rim sections to their normal positions when the pressure is removed by continued turning of the wheel.

This cushioning of the wheel occurs continuously as each succeeding rim section comes in contact with the ground, there being eight such sections in the present showing.

Where it is desirable to retract the lugs, this may be done by removal of the key 33, and releasing the plate 28 to be turned by gear wheel 30. In the present showing this would be done by hand and it is workable that way, the mechanical means for turning wheel 30 not being included in the present showing. Turning the plate 28 retracts or projects the lugs by its connection through links 32 and 22 and lifter plates 21 and 25.

The device when put to practice has been found to function effectively, particularly for travel on ice, and also when used on loose soils, the slippage being reduced to a minimum. At the same time it may be conveniently changed for use without the lugs 17.

While a preferred embodiment of my invention is herein disclosed, it is obvious that changes may be made in the construction and arrangement of parts, and in so far as such changes come within the spirit and scope of the invention as defined in the appended claims they would be considered a part hereof.

Having thus particularly described and ascertained the nature of my said invention, what I claim and wish to secure by Letters Patent is:

1. In a traction wheel providing a hub plate, a series of spokes fixed to the hub plate, a further series of spokes each having one end pivoted to the hub plate and the free end projecting outward, a rim for the wheel made up of a series of sections, means pivotally attaching the forward ends of each of said sections to a fixed wheel spoke, rollers on the free ends of the pivoted spokes, bolts anchoring the free end of each pivoted spoke to the next rearwardly adjacent fixed spoke, springs on said bolts tensioned by movement of the pivotal spokes towards the fixed spokes, and inclined plates on the free ends of the rim sections adapted to bear against the rollers on the pivoted wheel spokes when pressure of a load on the wheel causes the free ends of the rim sections to bear inwards.

2. A device as defined in claim 1 and including a series of angular lugs carried by each rim section, said lugs each having one end pivoted to its rim section, said rim sections providing openings through which the lugs are projectable, a bar for each set of lugs, lifter plates pivotally connected to said bars and rim sections one for each of said lugs, means slidably connecting the lifter plates and lugs, an annular plate carried by the fixed spokes free to rotate therein, links connecting said annular plate to the lug connecting bars, and manually operable means for rotating the annular plate.

References Cited in the file of this patent

UNITED STATES PATENTS

| 1,729,799 | Paterson et al. | Oct. 1, 1929 |
| 2,583,634 | Darvill | Jan. 29, 1952 |

FOREIGN PATENTS

| 836,791 | France | Oct. 25, 1938 |
| 1,016,259 | France | Aug. 20, 1952 |